(12) United States Patent
Heumann et al.

(10) Patent No.: US 11,841,248 B2
(45) Date of Patent: Dec. 12, 2023

(54) SCANNING ELEMENT AND INDUCTIVE POSITION MEASURING DEVICE HAVING A SCANNING ELEMENT

(71) Applicant: DR. JOHANNES HEIDENHAIN GmbH, Traunreut (DE)

(72) Inventors: Martin Heumann, Traunstein (DE); Christoph Heinemann, Übersee (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 17/543,970

(22) Filed: Dec. 7, 2021

(65) Prior Publication Data

US 2022/0178721 A1    Jun. 9, 2022

(30) Foreign Application Priority Data

Dec. 8, 2020  (EP) .................................... 20212347

(51) Int. Cl.
    *G01D 5/20*    (2006.01)
(52) U.S. Cl.
    CPC ..................... *G01D 5/20* (2013.01)
(58) Field of Classification Search
    CPC .... G01D 5/20; G01D 2205/77; G01D 5/2053; G01D 5/245; G01D 5/12
    See application file for complete search history.

(56) References Cited

U.S. PATENT DOCUMENTS

| | | | |
|---|---|---|---|
| 5,279,044 A * | 1/1994 | Bremer ................ | G01D 5/2495 356/617 |
| 8,278,911 B2 | 10/2012 | Tiemann et al. | |
| 10,645,810 B2 | 5/2020 | Rissing et al. | |
| 11,435,205 B2 * | 9/2022 | Ferreira Da Cunha ...................... | G01D 5/225 |
| 2002/0017902 A1 * | 2/2002 | Vasiloiu ............... | G01D 5/2046 324/207.17 |
| 2003/0137294 A1 * | 7/2003 | Gleixner .............. | G01D 5/2086 340/870.31 |
| 2017/0136906 A1 * | 5/2017 | Draeger .................. | H02J 50/90 |
| 2018/0274948 A1 * | 9/2018 | Maniouloux ............. | G01P 3/49 |
| 2019/0094047 A1 * | 3/2019 | Utermoehlen ........ | G01D 5/2073 |
| 2021/0063206 A1 * | 3/2021 | Ausserlechner ......... | G01B 7/30 |

(Continued)

FOREIGN PATENT DOCUMENTS

DE   102008017857 A1   10/2009
EP        2312272 A2    4/2011
(Continued)

*Primary Examiner* — Akm Zakaria
(74) *Attorney, Agent, or Firm* — CARTER, DELUCA & FARRELL LLP (57) ABSTRACT

A scanning element includes a circuit board having a first detector unit provided with a first receiver conductor trace arranged circumferentially about an axis in the circumferential direction. The course of the first receiver conductor trace has: a periodic configuration along a first line; a first gap along its extension in the circumferential direction; a first amplitude in the first quadrant or in the second quadrant of a Cartesian coordinate system; and a second amplitude in the third quadrant or in the fourth quadrant of the coordinate system. The origin of the coordinate system is located on the axis, and the ordinate extends centrically through the first gap in relation to the circumferential direction. The second amplitude is smaller than the first amplitude.

21 Claims, 6 Drawing Sheets

(56) References Cited

U.S. PATENT DOCUMENTS

2021/0117020 A1* 4/2021 Hamner ................ G01B 5/016
2022/0187335 A1* 6/2022 Shaga ................. G01D 5/2053

FOREIGN PATENT DOCUMENTS

EP         3355032  A1    8/2018
EP         3594629  A1    1/2020

* cited by examiner

SCANNING ELEMENT AND INDUCTIVE POSITION MEASURING DEVICE HAVING A SCANNING ELEMENT

CROSS-REFERENCE TO RELATED APPLICATIONS

The present application claims priority to Application No. 20212347.7, filed in the European Patent office on Dec. 8, 2020, which is expressly incorporated herein in its entirety by reference thereto.

FIELD OF THE INVENTION

The present invention relates to a scanning element, e.g., for an inductive position measuring device for determining a position of the scanning element relative to two scale elements that are rotatable at different speeds and to a position measuring device having such a scanning element.

BACKGROUND INFORMATION

Inductive position measuring devices, for example, are used as angle encoders for determining the angular position of machine parts that are rotatable relative to one another. In inductive position measuring devices, excitation tracks and receiver tracks, such as in the form of conductor traces, are often mounted on a shared, usually multi-layer circuit board, which is firmly connected to a stator of an angle encoder, for example. Arranged opposite this circuit board is a scale element on which graduation structures are provided and which is connected to the rotor of the angle measuring device in a torsionally fixed manner. When an electrical excitation current that varies over time is applied to the excitation tracks, signals are generated in the receiver coils during the relative rotation between the rotor and stator that are a function of the angular position. These signals are further processed in an evaluation electronics.

More specifically, inductive position measuring devices are often used in drives of robots as measuring devices for determining the angular position of a drive shaft and simultaneously for the exact determination of the angular position of an output shaft, a reduction gear initiating the movement of the drive shaft into the output shaft. In this case, angular positions or angular settings are measured with the aid of a scanning element which encompasses a circuit board provided with corresponding detector units on both sides, so that the respective angular position of scale elements situated in a rotatable manner on both sides of the circuit board is able to be determined.

BACKGROUND INFORMATION

European Patent Document No. 2 312 272 describes, for example, in FIG. 4, a position measuring device, whose stator has receiver conductor traces featuring gaps that extend in the circumferential direction.

SUMMARY

Example embodiments of the present invention provides a scanning element for an inductive position measuring device that operates in a relatively precise manner and has a relatively compact configuration.

According to an example embodiment of the present invention, a scanning element, which is adapted and intended for an inductive position measuring device, includes a circuit board that has a first detector unit provided with at least a first receiver conductor trace disposed circumferentially about an axis in the circumferential direction. The first receiver conductor trace has a periodic arrangement along a first line. In addition, the periodic course, or path, of the first receiver conductor trace has a first gap along its extension in the circumferential direction. A Cartesian coordinate system is introduced for the definition of the geometrical arrangement and configuration of the receiver conductor trace, the Cartesian coordinate system being aligned such that its origin is located on the axis and its ordinate extends centrically through the first gap in relation to the circumferential direction. The first receiver conductor trace has a first amplitude in the first quadrant or in the second quadrant of the coordinate system. In the third quadrant or in the fourth quadrant of the coordinate system, the first receiver conductor trace has a second amplitude. The condition moreover applies according to which the second amplitude is lower than the first amplitude.

The first detector unit, for example, includes a first receiver track, which in turn encompasses multiple receiver conductor traces (including the first receiver conductor trace) and, optionally, a first excitation track. The first excitation track is arranged circumferentially about the axis in the circumferential direction.

A receiver conductor trace may extend in two planes or in two layers of a circuit board, and corresponding pieces or sections of such a receiver conductor trace are electrically connected to sections in another layer with the aid of through-contacts (e.g., in the form of micro vias). Because of the periodic characteristic, the receiver conductor trace has points of intersection, in a top view. These points of intersection are points in which the receiver conductor trace overlaps in its periodic characteristic, the receiver conductor trace extending in different layers of the circuit board in the area of the points of intersection so that no undesired short circuits are created at the points of intersection.

The periodic course of the first receiver conductor trace is arranged such that the receiver conductor trace encloses areas between the points of intersection that particularly extend along the line at a length that corresponds to one-half a period length in each case. A gap is an area where no such enclosed area exists. An amplitude may be specified in a meaningful manner only in an area of the (e.g., first) receiver conductor trace in which the course of the (e.g., first) receiver conductor trace is periodic, the (e.g., second) amplitude furthermore having to be greater than zero. Especially areas of the first receiver conductor trace in which no enclosed areas are present have no amplitude (e.g., no second amplitude).

As a consequence, the first receiver conductor trace disposed on the circuit board circumferentially about the axis in the circumferential direction does not extend across the full 360° in the circumferential direction, but across a smaller angle value due to the extension of the gap.

The maximum distance of the receiver conductor trace from the line within a period length may be considered to be the amplitude. The wording according to which the course of the receiver conductor trace has a certain amplitude in a quadrant indicates that such an amplitude occurs within at least one of the multiple period lengths.

The first line may be understood to be a line that is formed especially by the connection of points of intersection of the first receiver conductor trace or as a line on which the points of intersection are located. For example, the first line may have a circular configuration, in which case the center point of the first line then, for example, is located on the axis.

For example, the first receiver conductor trace outside the first gap has a periodic course featuring a constant first period length ($\lambda 1$). The first receiver conductor trace thus always extends at the same first period length ($\lambda 1$) in the circumferential direction, whereas the amplitude varies.

The course of the first receiver conductor trace may have the first amplitude both in the first quadrant and in the second quadrant. Alternatively or additionally, the course of the first receiver conductor trace may have the second amplitude in both the third quadrant and the fourth quadrant.

The course of the first receiver conductor trace may, for example, have a further amplitude in the third quadrant or in the fourth quadrant of the coordinate system, the further amplitude being smaller than the first amplitude and larger than the second amplitude.

For example, the first gap extends across a first length L1 in the circumferential direction, and the first length L1 is as large as the first period length ($\lambda 1$) or as large as a multiple of the first period length ($\lambda 1$) (e.g., L1=n·$\lambda 1$, with n as a natural number being greater than zero). For example, the first gap extends across a first length L1 in the circumferential direction, and the first length L1 is as large as one-half the first period length ($\lambda 1$) or as large as a multiple of one-half the first period length ($\lambda 1$) (e.g., L1=(n·$\lambda 1$)/2, with n as a natural number being greater than zero).

The circuit board may include electronic components.

According to example embodiments, the circuit board includes a second detector unit, which has a second receiver conductor trace. The second receiver conductor trace is also arranged circumferentially about the axis in the circumferential direction and has a periodic course along a second line. More specifically, the second detector unit, for example, includes a second receiver track, which in turn encompasses a plurality of receiver conductor traces (including the second receiver conductor trace) and, optionally, a second receiver track. The second receiver track is arranged circumferentially about the axis in the circumferential direction.

The second line may also be understood as a line that is formed, for example, by the connection of points of intersection of the second receiver conductor trace or as a line on which the points of intersection are located. The second line may have a circular configuration, for example. The center point of the second line may, for example, be located on the axis.

In addition, the second receiver conductor trace is arranged such that it has a third amplitude in the first quadrant or in the second quadrant of a further Cartesian coordinate system, and that it has a fourth amplitude in the third quadrant or in the fourth quadrant of the coordinate system. If the origin of the further coordinate system is located on the axis and the ordinate of the further coordinate system extends centrically through the second gap, the third amplitude is greater than the fourth amplitude.

The circuit board has a geometric center plane, the center plane, e.g., being located between the first detector unit and the second detector unit.

Generally, the two largest (surface) areas or the sides of a circuit board have a parallel orientation with respect to one another. The center plane, for example, is arranged in the center between these circuit board areas in parallel with the areas or sides, so that—especially in a direction z with an orthogonal orientation with respect to the center plane—the distance between an area or side of the circuit board with respect to the center plane has precisely the same size as the distance between the other area or the other side of the circuit board to the center plane.

The second detector unit and at least one of the electronic components may be arranged on the same side of the circuit board. Given such a configuration, the second detector unit and the electronic component are thus arranged in the same direction at an offset with respect to the center plane, so that the center plane is not arranged between the second detector unit and the electronic component.

The first detector unit may have a third receiver track, and the second detector unit may have a fourth receiver track. Moreover, the first detector unit may have a third excitation track, and the second detector unit may have a fourth excitation track.

The first excitation track and the second excitation track may extend along the circumferential direction.

The first receiver track and the second receiver track may extend along the circumferential direction as also the first excitation track and the second excitation track.

The scanning element may be arranged such that the first excitation track and the second excitation track are electrically connected in series.

The first excitation track and the second excitation track are, for example, energizable by an excitation current which usually has a current intensity that varies over time (alternating current or mixed current). The excitation current is able to be generated with the aid of the electronic components, which means that their characteristic may be shaped by the electronic components. Since a physical relationship exists between the current intensity and the voltage intensity, the same view may also be taken for the excitation voltage.

The particular signals able to be generated by the first receiver track and the second receiver track may be further processed with the aid of the electronic components, which form, for example, an evaluation circuit.

The electronic components may be components of different electronic circuits or be assigned to different circuits. For example, certain electronic components may be components of the circuit for generating an excitation current or further electronic components may be components of a further circuit for evaluating or further processing signals.

Example embodiments of the present invention include an inductive position measuring device provided with the scanning element as well as a first scale element, the first scale element being situated at an offset in parallel with the axis and at a distance from the circuit board.

For example, the first scale element has a graduation track that has an annular configuration and a concentric arrangement with regard to the axis, the graduation track including graduation structures which include a periodic sequence of alternatingly arranged, electrically conductive graduation regions and non-conductive graduation regions.

The position measuring device may have a second scale element. The scale elements are arranged in the z direction (orthogonal to the center plane) at a distance on both sides of the circuit board.

For example, the first scale element has a first diameter D1 and the second scale element has a second diameter d2, the first diameter D1 being greater than the second diameter d2 (e.g., D1>d2).

In addition, the scale elements may be arranged so as to be rotatable about a shared axis relative to the scanning element.

Moreover, at least one of the electronic components may be disposed at a greater distance from the axis than the outer contour of the second scale element. Thus, the at least one electronic component will be arranged radially outside the second scale element.

Further features and aspects of example embodiments of the present invention are described in more detail below with reference to the appended schematic Figures.

DETAILED DESCRIPTION

Example embodiments of the present invention will be described based on a position measuring device provided with a scanning element 1, which may be used both for detecting an angular position of a first scale element 2 and an angular position of a second scale element 3. Both scale elements 2, 3 are arranged so as to be rotatable about an axis R relative to scanning element 1. Such a position measuring device is able to be used in a drive device of a robot, for example. Second scale element 3 is connected in a torsionally fixed manner to a drive shaft of a motor, for example. The drive shaft, in turn, is connected to a reduction gear, which has an output shaft. First scale element 2 rotates with this drive shaft. In this manner, for example, it is possible to perform an angle adjustment for commutating the motor with the aid of second scale element 3 and a relatively highly precise angular adjustment for positioning the robot with the aid of first scale element 2.

Scanning element 1 includes a circuit board 1.1, which has multiple layers, as well as electronic components 1.2, which are mounted on circuit board 1.1. Scanning element 1 is used for scanning a first scale element 2 and simultaneously for scanning second scale element 3. In the illustrated example embodiment, electronic components 1.2 are mounted only on the second side. Alternatively or additionally, however, the first side of circuit board 1.1 may also be fitted with electronic components.

Figure 1:
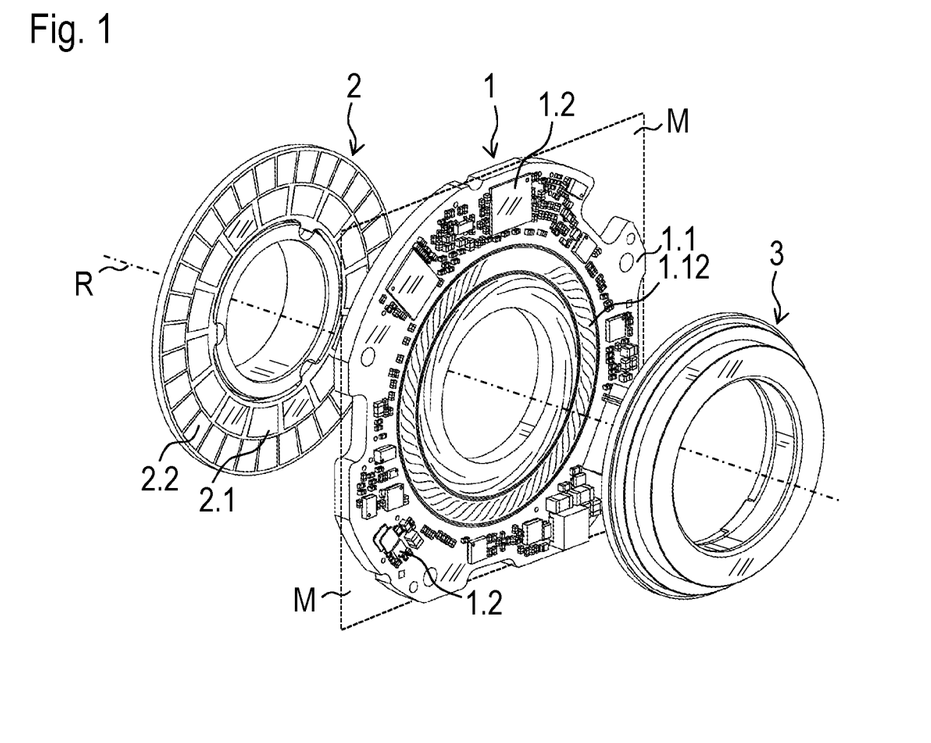
FIG. 1 is a perspective view of a position measuring device including a scanning element a first scale element, and a second scale element.

To determine the angle information, a first detector unit 1.11 is arranged on a first side of circuit board 1.1 and a second detector unit 1.12 is arranged on a second side of circuit board 1.1. FIG. 1 schematically illustrates only the particular structures of second detector unit 1.12 that are arranged on an outer layer of circuit board 1.1.

Figure 2:
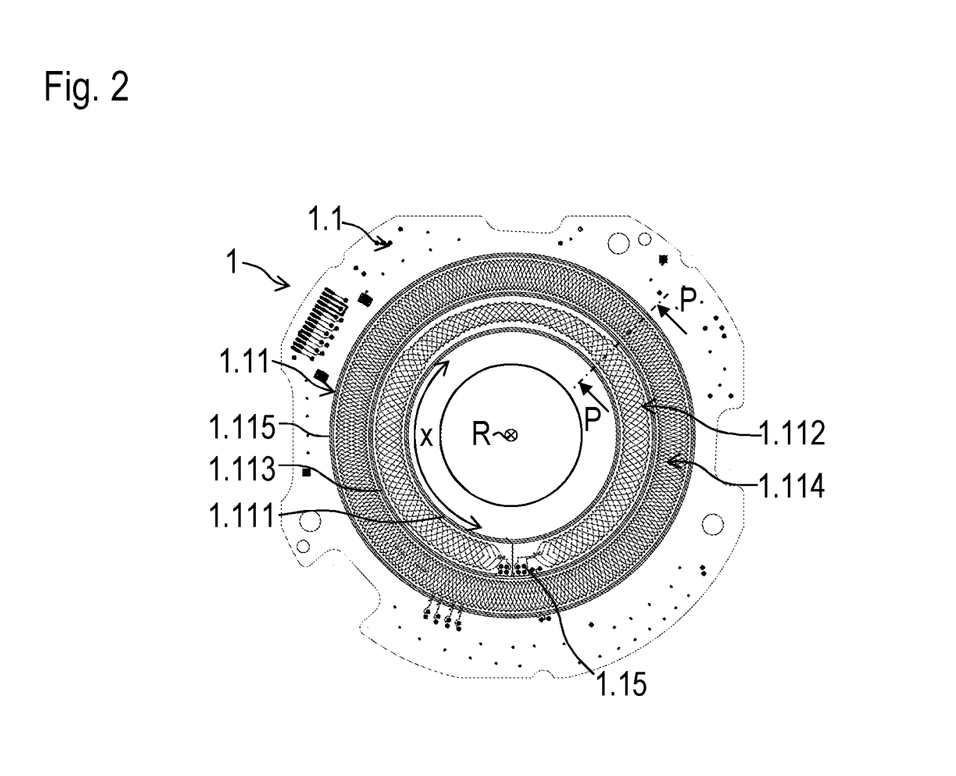
FIG. 2 is a top view of a first side of the scanning element.
Figure 3:
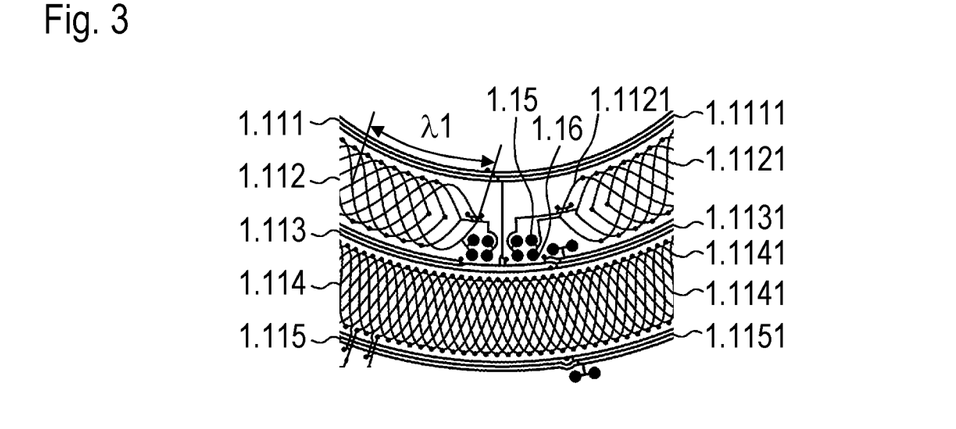
FIG. 3 is an enlarged view of the first side of the scanning element.

In contrast, FIGS. 2 and 3 (e.g., FIG. 3 represents an enlarged view of first detector unit 1.11 illustrated in FIG. 2) show, for example, the particular structures of first detector unit 1.11 that are arranged in an external layer of circuit board 1.1 and in a layer of circuit board 1.1 located farther on the inside. First detector unit 1.11 includes a first excitation track 1.111, a first receiver track 1.112, a third excitation track 1.113, a third receiver track 1.114, and a fifth excitation track 1.115. First receiver track 1.112 includes first receiver conductor traces 1.1121.

Figure 4:
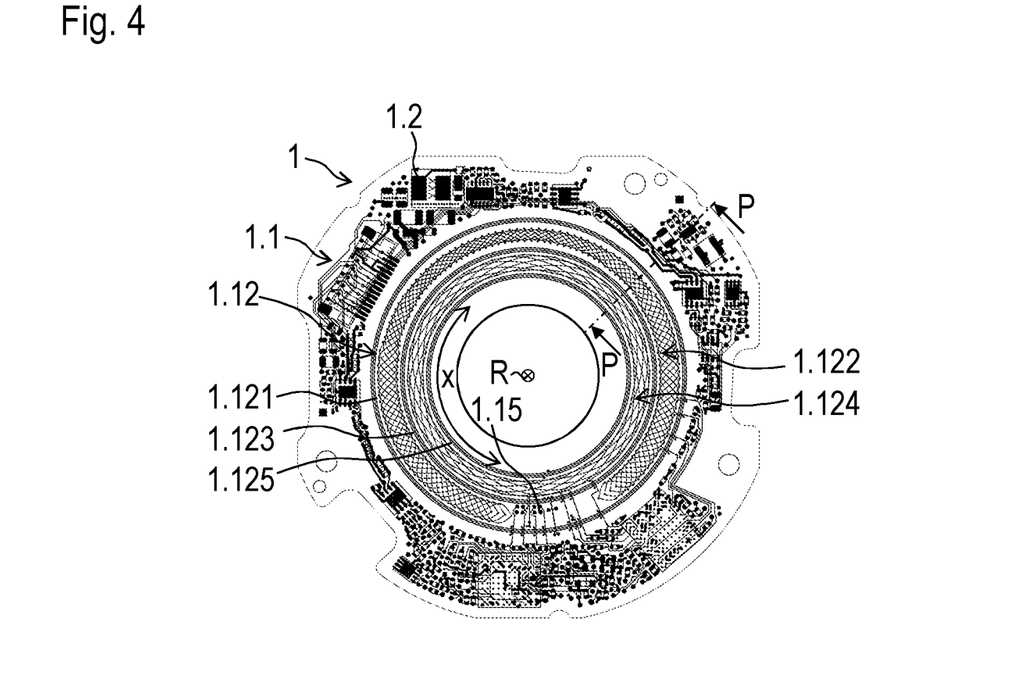
FIG. 4 is a plan view of a second side of the scanning element.
Figure 5:
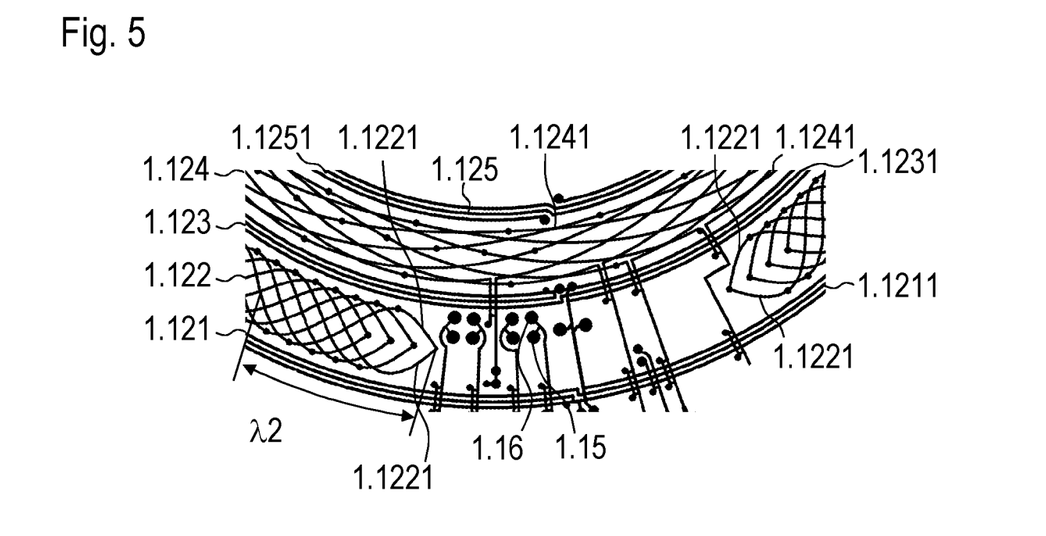
FIG. 5 is an enlarged view of the second side of the scanning element.

FIGS. 4 and 5 illustrate circuit board 1.1 from the other side so that second detector unit 1.12 is visible. FIG. 5 is an enlarged view of second detector unit 1.12. For example, FIGS. 4 and 5 illustrate the particular structures of second detector unit 1.12 that are arranged in an outer layer of circuit board 1.1 and in an adjacent layer of circuit board 1.1 that is located farther inside. Second detector unit 1.12 includes a second excitation track 1.121, a second receiver track 1.122, a fourth excitation track 1.123, a fourth receiver track 1.124, and a sixth excitation track 1.125. Second receiver track 1.122 includes second receiver conductor traces 1.1221.

From a geometrical point of view, a so-called center plane M (see, e.g., FIG. 1), which is centrally located between the first and second side, in parallel with the first side or in parallel with the second side of circuit board 1.1, may be defined for circuit board 1.1. Axis R has an orthogonal extension relative to center plane M. Circuit board 1.1 is configured such that geometric center plane M is located between first detector unit 1.11 and second detector unit 1.12.

Excitation tracks 1.111, 1.113, 1.115 of first detector unit 1.11 include excitation conductor traces 1.1111, 1.1131, 1.1151, and excitation tracks 1.121, 1.123, 1.125 of second detector unit 1.12 include excitation conductor traces 1.1211, 1.1231, 1.1251.

Excitation tracks 1.111, 1.113, 1.115 of first detector unit 1.11 enclose first receiver track 1.112 and/or third receiver track 1.114.

Excitation tracks 1.121, 1.123, 1.125 of second detector unit 1.12 enclose second receiver track 1.122 or fourth receiver track 1.124. Excitation tracks 1.111, 1.113, 1.115, 1.121, 1.123, 1.125 and excitation tracks 1.112, 1.114, 1.122, 1.124 extend along circumferential direction x.

In the illustrated example embodiment, each receiver track 1.112, 1.114, 1.122, 1.124 includes receiver conductor traces 1.1121, 1.1141, 1.1221, 1.1241, which are arranged at an offset in circumferential direction x so that they are able to supply four signals that are offset in phase in accordance with the offset. In the Figures, the particular receiver conductor traces 1.1121, 1.1141, 1.1221, 1.1241 that belong to one and the same receiver track 1.112, 1.114, 1.122, 1.124 are provided with only a single reference numeral. As a consequence, all receiver conductor traces 1.1121 of first receiver track 1.112, for example, thus have only a single reference numeral. In addition, first receiver conductor traces 1.1121 of first detector unit 1.11 are connected to vias in different layers of circuit board 1.1, so that undesired short circuits at points of intersection N1, N2 are avoided (see, e.g., FIGS. 6 and 7). The same applies also to receiver conductor traces 1.1221, 1.1241 of second detector unit 1.12. Although each first and second receiver conductor trace 1.1121, 1.1221 includes many conductor sections that are distributed to two planes or layers and lined up next to one another, such a structure is denoted below overall as a receiver conductor trace 1.1221, 1.1241.

Along a circular first line K1 or a circular second line K2 (see, e.g., FIGS. 6 and 7), first and second receiver conductor traces 1.1121, 1.1221 have a spatially periodic curst that is substantially sinusoidal or sine-shaped. Lines K1, K2 form a quasi-circular abscissa in relation to the sinusoidal course of receiver conductor traces 1.1121, 1.1221 in each case. In all other respects, the center points of circular lines K1, K2 are located on axis R. First line K1 may also be considered to be the connecting line between adjacent first points of intersection N1. Similarly, second line K2 may be defined as the connecting line between adjacent second points of intersection N2. All first points of intersection N1 are located on circular first line K1, and all second points of intersection N2 are located on circular second line K2.

Receiver conductor traces 1.1121 of first receiver track 1.112 have a period length λ1 (see, e.g., FIG. 3), while receiver conductor traces 1.1221 of second receiver track 1.122 have a period length λ2 (see, e.g., FIG. 5). In the illustrated example embodiment, receiver conductor traces 1.1121, 1.1141, 1.1221, 1.1241 adjacent within a receiver track 1.112, 1.114, 1.122, 1.124 are arranged at an offset from one another by ⅛ of the full sine period (λ/4 or 45° along circumferential direction x), so that they are able to generate corresponding phase-offset signals. Receiver conductor traces 1.1121, 1.1141, 1.1221, 1.1241 are electrically connected such that they supply 0° and 90° signals on the one hand and 45° and 135° signals on the other hand. A first position signal is able to be determined from the 0° and 90° signals, and a second position signal, redundant with respect to the first position signal, is able to be determined from the 45° and 135° signals.

Figure 6:
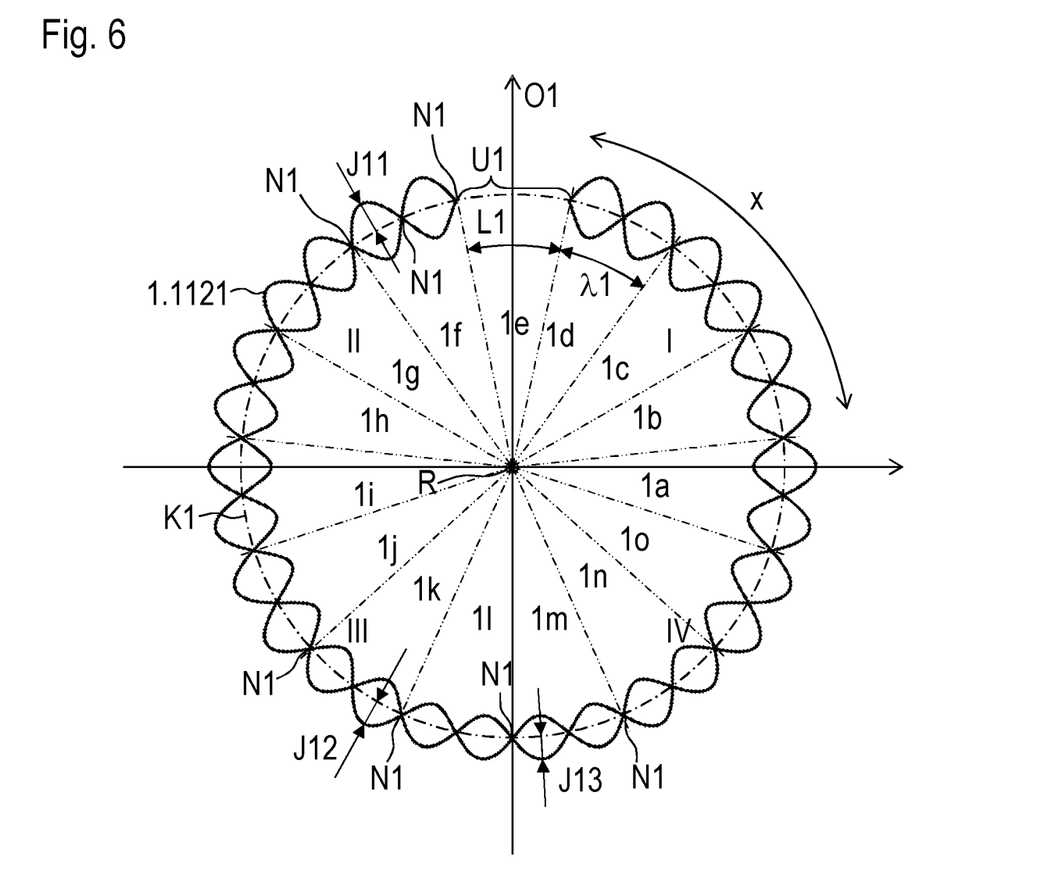
FIG. 6 illustrates a first receiver conductor trace of the first side of the scanning element.

FIG. 6 illustrates a simplified view of a first receiver conductor trace 1.1121 of first receiver track 1.112, in which the receiver conductor traces, phase-shifted thereto, of the first receiver track 1.112 are omitted for clarity. The course of first receiver conductor trace 1.1121, which belongs to one and the same phase or supplies the signal for a phase, has a first gap U1 along its extension in circumferential direction x, as illustrated in FIG. 6. First receiver conductor trace 1.1121 of a phase thus restricts the region of first gap U1. No periodically extending first receiver conductor trace 1.1121 of the particular phase is arranged in the region of first gap U1.

According to first period length λ1, receiver conductor trace 1.1121, which belongs to one and the same phase as in FIG. 6, is able to be subdivided into fifteen sectors 1a to 1o of equal size, each extending across a central angle of 24°. As illustrated in FIG. 6, first gap U1 extends across an angular first length L1, which corresponds to a first period length λ1 or 24°, so that the following relationship is satisfied: L1=λ1=24°. A Cartesian coordinate system may first be introduced in order to describe the geometric system, the Cartesian coordinate system being arranged such that its origin is located on axis R or on the center point of first line K1 and ordinate O1 simultaneously extends centrically through first gap U1. In circumferential direction x, ordinate O1 thus has the same distance from the ends of periodically extending first receiver conductor trace 1.1121. According to the usual subdivision, the coordinate system has four quadrants I to IV. The course of first receiver conductor trace 1.1121 has different amplitudes J11, J12, J13 along circumferential direction x. Different distances between first line K1 and sinusoidally extending receiver conductor trace 1.1121 thus exist in the region of the maximum deflection in each case. In the illustrated example embodiment, the following amplitudes J11, J12, J13 can be determined for respective sectors 1a to 1o:

| | | |
|---|---|---|
| Amplitude J11 (100%): | sectors | 1a to 1c, 1d, 1f to 1j, 1o |
| Amplitude J12 (80%): | sectors | 1k, 1n |
| Amplitude J13 (70%): | sectors | 1l, 1m |
| No amplitude: | sector | 1e (region of first gap U1) |

The course of first receiver conductor trace 1.1121 in first quadrant I and in second quadrant II thus has first amplitude J11. In addition, the course of first receiver conductor trace 1.1121 in third quadrant III and in fourth quadrant IV has a second amplitude J13, which is smaller than first amplitude J11.

Moreover, the course of first receiver conductor trace 1.1121 in third quadrant III and in fourth quadrant IV of the coordinate system has a further amplitude J12, which is smaller than first amplitude J11 and larger than second amplitude J13, which means that J11>J12>J13.

Figure 7:
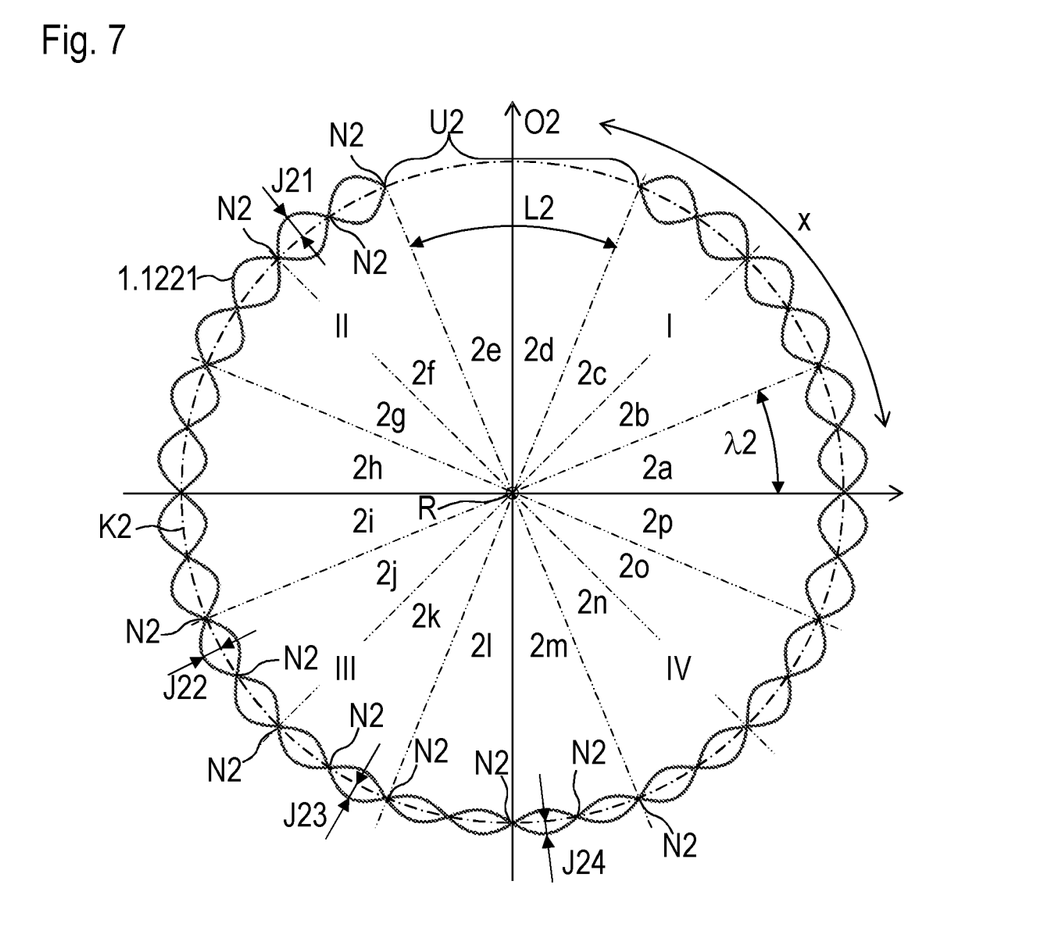
FIG. 7 illustrates a second receiver conductor trace of the second side of the scanning element.

FIG. 7 is a simplified view of a second receiver conductor trace 1.1221 of second receiver track 1.122. Similar to FIG. 6, the receiver conductor traces that are phase-shifted thereto have been omitted.

The course of second receiver conductor trace 1.1221, which belongs to one and the same phase according to FIG. 7, has a second gap U2 along its extension in circumferential direction x. Second receiver conductor trace 1.1221 thus restricts the area of second gap U2. No periodically extending second receiver conductor trace 1.1221 of the particular phase is arranged in the area of second gap U2. According to second period length λ2, receiver conductor trace 1.1221, which belongs to one phase as in FIG. 6, is able to be subdivided into sixteen sectors 2a to 2p of equal size, which extend across a central angle of 22.5° in each case. As illustrated in FIG. 7, second gap U2 extends across an angular second length L2, which corresponds to twice the second period length λ2, that is to say, to 45°. The relationship L2=2·λ2=2.22.5° is therefore satisfied. In second receiver track 1.122, as well, the course of second receiver conductor trace 1.1221 has different amplitudes J21, J22, J23, J24 along circumferential direction x. In the illustrated example embodiment, the following amplitudes J21, J22, J23, J24 can be found for respective sectors 2a to 2p:

| | | |
|---|---|---|
| Amplitude J21 (100%): | sectors | 2a to 2c, 2f to 2i, 2p |
| Amplitude J22 (80%): | sectors | 2j, 2o |
| Amplitude J23:(65%) | sectors | 2k, 2n |
| Amplitude J24 (50%): | sectors | 2l, 2m |
| No amplitude: | sectors | 2d, 2e (in the area of second gap U2) |

Thus, the course of second receiver conductor trace 1.1221 in first quadrant I and in second quadrant II has third amplitude J21. In addition, the course of second receiver conductor trace 1.1221 in third quadrant III and in fourth quadrant IV has a fourth amplitude J24, which is smaller than third amplitude J21.

The course of second receiver conductor trace 1.1221 is arranged such that the transition from maximum third amplitude J21 to minimum fourth amplitude J24 takes place in a stepped manner. The course of second receiver conductor trace 1.1221 in third quadrant III and in fourth quadrant IV of the coordinate system therefore has two further amplitudes J22, J23, which are smaller than third amplitude J21 and larger than fourth amplitude J24, so that J21>J22>J23>J24 is satisfied.

Moreover, circuit board 1.1 has through-contacts 1.15, 1.16 (see, e.g., FIGS. 3 and 5). Circuit board 1.1 is arranged such that through-contacts 1.15, 1.16 are situated both within first gap U1 and within second gap U2. With the aid of through-contact 1.15, first receiver conductor traces 1.1121 of first receiver track 1.112 are electrically connected to an electronic component 1.2, which is arranged on the other side of center plane M. A particularly compact configuration of circuit board 1.1 is able to be achieved because of this arrangement of the course of first and second receiver conductor traces 1.1121, 1.1221 with gaps U1, U2. According to example embodiments of the present invention, the deficits in the signals caused by gaps U1, U2, are able to be compensated for by the configuration of the course of first and second receiver conductor trace 1.1121, 1.1221 so that a compact arrangement and also a precise angle measurement are ultimately achievable.

Figure 8:
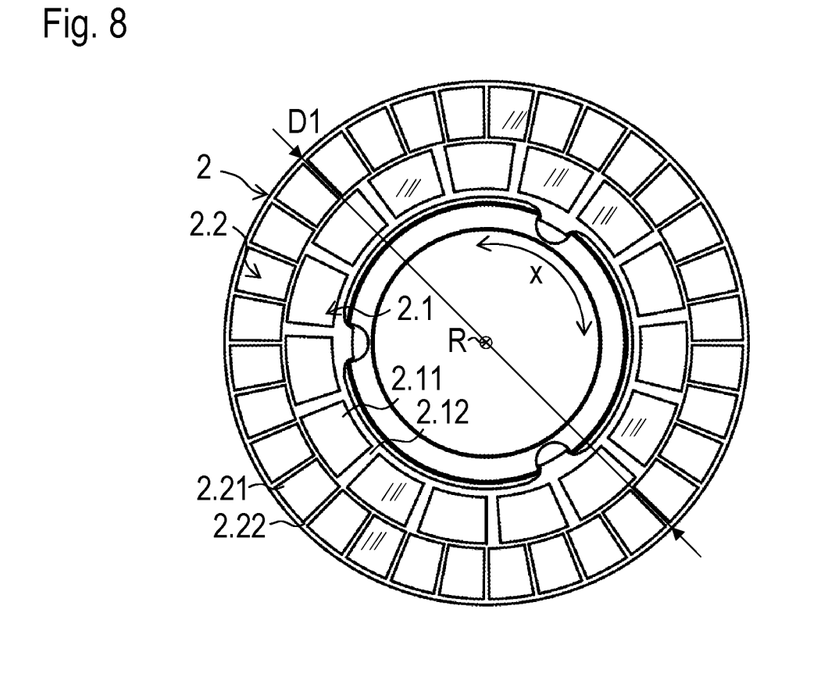
FIG. 8 is a top view of a first scale element.

FIG. 8 shows first scale element 2 in a top view. Second scale element 3 is also shown in a top view in FIG. 9. Scale elements 2, 3 have a disk-shaped form, and first scale element 2 has a first diameter D1 and second scale element 3 has a second diameter d2. First diameter D1 is larger than second diameter d2 (e.g., D1>d2).

Figure 9:
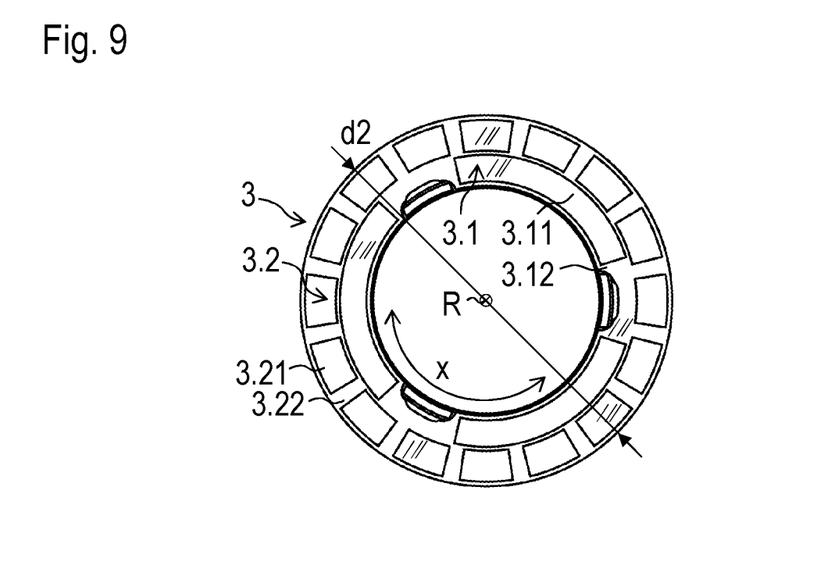
FIG. 9 is a top view of a second scale element.

In the illustrated example embodiment, scale elements 2, 3 are made from a substrate which is produced from epoxy resin and on which two graduation tracks 2.1, 2.2; 3.1, 3.2 are arranged in each case. Graduation tracks 2.1, 2.2; 3.1, 3.2 have an annular configuration and are provided with different diameters on the substrate concentrically with respect to axis R. Graduation tracks 2.1, 2.2; 3.1, 3.2 include graduation structures that include a periodic sequence of alternatingly disposed, electrically conductive graduation regions 2.11, 2.21; 3.11, 3.21 and non-conductive graduation regions 2.12, 2.22; 3.12, 3.22. In the illustrated example, copper is applied onto the substrate as the material for electrically conductive subregions 2.11, 2.21; 3.11, 3.21. In non-conductive graduation regions 2.12, 2.22; 3.12, 3.22, on the other hand, the substrate is not coated. Because of the arrangement featuring two graduation tracks 2.1, 2.2; 3.1, 3.2 in each case, the angular positions of scale elements 2, 3 are able to be determined in absolute terms. Outermost graduation track 2.2 of first scale element 2 has a greater number of graduation regions 2.21, 2.22 along a circumferential line, which means that the greatest resolution with regard to the measurement of the angular position is achievable.

In the assembled state, illustrated in FIG. 1, scanning element 1 and scale elements 2, 3 are arranged opposite each other with an axial clearance or an air gap, so that a signal as a function of the respective angular position is able to be generated by induction effects in receiver conductor traces 1.1121, 1.1141, 1.1221, 1.1241 in a relative rotation between scale elements 2, 3 and scanning element 1. A precondition for the generation of corresponding signals is that excitation circuit traces 1.1111, 1.1131, 1.1151, 1.1211, 1.1231, 1.1251 generate an electromagnetic excitation field that varies over time in the region of the scanned graduation structures. In the illustrated example embodiment, excitation circuit traces 1.1111, 1.1131, 1.1151, 1.1211, 1.1231, 1.1251 are arranged as a plurality of plan-parallel, current-traversed individual circuit traces. Scanning element 1 has an electronic circuit including electronic components 1.2. The electronic circuit may also include an ASIC component, for example. This electronic circuit of scanning element 1 functions not only as an evaluation element but also as an excitation control element under whose control the excitation current is generated or produced, which flows through excitation conductor traces 1.1111, 1.1131, 1.1151, 1.1211, 1.1231, 1.1251. Excitation conductor traces 1.1111, 1.1131, 1.1151, 1.1211, 1.1231, 1.1251 are therefore energized by one and the same excitation control element. The first excitation track 1.111 and second excitation track 1.121 are electrically connected in series.

When excitation tracks 1.111, 1.113, 1.115, 1.121, 1.123, 1.125 are energized, an electromagnetic field oriented in the form of a tube or cylinder forms around excitation conductor traces 1.1111, 1.1131, 1.1151, 1.1211, 1.1231, 1.1251. The field lines of the resulting electromagnetic field extend around excitation tracks 1.111, 1.113, 1.115, 1.121, 1.123, 1.125, the direction of the field lines, depending on the current direction in excitation circuit traces 1.1111, 1.1131, 1.1151, 1.1211, 1.1231, 1.1251. Eddy currents are induced in the area of conductive subregions 2.11, 2.21; 3.11, 3.21 so that a modulation of the field as a function of the angular position is achieved in each case. Receiver conductor traces 1.112, 1.114, 1.122, 1.124 are therefore able to measure the relative angular position. The pairs of receiver conductor traces 1.1121, 1.1141, 1.1221, 1.1241 are arranged in their respective receiver track 1.112, 1.114, 1.122, 1.124 such that they supply signals that are offset in phase by 90° so that the direction of rotation is able to be determined as well. The signals that are generated by receiver tracks 1.112, 1.114, 1.122, 1.124 are further processed with the aid of a few of the electronic components 1.2, which form an evaluation circuit.

From the aspect of a high measuring accuracy in combination with relatively generous permissible mounting tolerances it is beneficial that so-called all-round scanning takes place. In an all-round scan, a scale element 2, 3 is scanned in its entirety at every instant, that is to say, practically across the entire circumference. This offers advantages as far as the compensation of occurring tumbling errors or eccentricities in the measuring result are concerned. The scanning element 1 allows for a precise measurement even if receiver conductor traces 1.1121, 1.1221 include a gap U1, U2.

What is claimed is:

1. A scanning element for an inductive position measuring device, comprising:
a circuit board including a first detector unit having a first receiver conductor trace arranged circumferentially about an axis in a circumferential direction, a course of the first receiver conductor trace:
being periodic along a first line;
having a first gap along an extension of the first receiver conductor trace in the circumferential direction;
having a first amplitude in a first quadrant and/or in a second quadrant of a Cartesian coordinate system; and
having a second amplitude in a third quadrant and/or in a fourth quadrant of the Cartesian coordinate system;
wherein an origin of the coordinate system coincides with the axis and an ordinate of the coordinate system extends centrically through the first gap in relation to the circumferential direction; and
wherein the second amplitude is smaller than the first amplitude.

2. The scanning element according to claim 1, wherein the first line is circular.

3. The scanning element according to claim 1, wherein the first receiver conductor trace has a periodic course having a constant first period length.

4. The scanning element according to claim 1, wherein the course of the first receiver conductor trace has the first amplitude in the first quadrant and in the second quadrant.

5. The scanning element according to claim 4, wherein the course of the first receiver conductor trace has the second amplitude in the third quadrant and in the fourth quadrant.

6. The scanning element according to claim 1, wherein the course of the first receiver conductor trace has a further amplitude in the third quadrant or in the fourth quadrant, the further amplitude being smaller than the first amplitude and larger than the second amplitude.

7. The scanning element according to claim 1, wherein the circuit board includes electronic components.

8. The scanning element according to claim 1, wherein the circuit board includes a second detector unit having a second receiver conductor trace arranged circumferentially about the axis in the circumferential direction, a course of the second receiver conductor trace:
- being periodic along a second line;
- having a second gap along an extension of the second receiver conductor trace in the circumferential direction;
- having a third amplitude in a first quadrant or in a second quadrant of a further Cartesian coordinate system; and
- having a fourth amplitude in a third quadrant or in a fourth quadrant of the further Cartesian coordinate system;

wherein an origin of the further Cartesian coordinate system is located on the axis, and an ordinate of the further Cartesian coordinate system extends centrically through the second gap; and
wherein the fourth amplitude is smaller than the third amplitude.

9. The scanning element according to claim 1, wherein the circuit board includes a second detector unit having a second receiver conductor trace arranged circumferentially about the axis in the circumferential direction, the circuit board having a geometric center plane located between the first detector unit and the second detector unit.

10. An inductive position measuring device, comprising:
a scanning element, including:
  a circuit board including a first detector unit having a first receiver conductor trace arranged circumferentially about an axis in a circumferential direction, a course of the first receiver conductor trace:
    being periodic along a first line;
    having a first gap along an extension of the first receiver conductor trace in the circumferential direction;
    having a first amplitude in a first quadrant and/or in a second quadrant of a Cartesian coordinate system; and
    having a second amplitude in a third quadrant and/or in a fourth quadrant of the Cartesian coordinate system; and
  a first scale element arranged at an offset in parallel with the axis at a distance from the circuit board;
wherein an origin of the coordinate system coincides with the axis and an ordinate of the coordinate system extends centrically through the first gap in relation to the circumferential direction; and
wherein the second amplitude is smaller than the first amplitude.

11. The inductive position measuring device according to claim 10, wherein the first scale element includes an annular graduation track arranged concentrically with respect to the axis, the graduation track having graduation structures that include a periodic sequence of alternatingly arranged, electrically conductive graduation regions and non-conductive graduation regions.

12. The inductive position measuring device according to claim 10, further comprising a second scale element, the first scale element and the second scale element being arranged at a distance on both sides of the circuit board in a direction orthogonal to the center plane of the circuit board.

13. The inductive position measuring device according to claim 12, wherein the first scale element has a first diameter and the second scale element has a second diameter, the first diameter being greater than the second diameter.

14. The inductive position measuring device according to claim 10, wherein the first line is circular.

15. The inductive position measuring device according to claim 10, wherein the first receiver conductor trace has a periodic course having a constant first period length.

16. The inductive position measuring device according to claim 10, wherein the course of the first receiver conductor trace has the first amplitude in the first quadrant and in the second quadrant.

17. The inductive position measuring device according to claim 16, wherein the course of the first receiver conductor trace has the second amplitude in the third quadrant and in the fourth quadrant.

18. The inductive position measuring device according to claim 10, wherein the course of the first receiver conductor trace has a further amplitude in the third quadrant or in the fourth quadrant, the further amplitude being smaller than the first amplitude and larger than the second amplitude.

19. The inductive position measuring device according to claim 10, wherein the circuit board includes electronic components.

20. The inductive position measuring device according to claim 10, wherein the circuit board includes a second detector unit having a second receiver conductor trace arranged circumferentially about the axis in the circumferential direction, a course of the second receiver conductor trace:
- being periodic along a second line;
- having a second gap along an extension of the second receiver conductor trace in the circumferential direction;
- having a third amplitude in a first quadrant or in a second quadrant of a further Cartesian coordinate system; and
- having a fourth amplitude in a third quadrant or in a fourth quadrant of the further Cartesian coordinate system;

wherein an origin of the further Cartesian coordinate system is located on the axis, and an ordinate of the further Cartesian coordinate system extends centrically through the second gap; and
wherein the fourth amplitude is smaller than the third amplitude.

21. The inductive position measuring device according to claim 10, wherein the circuit board includes a second detector unit having a second receiver conductor trace arranged circumferentially about the axis in the circumferential direction, the circuit board having a geometric center plane located between the first detector unit and the second detector unit.

* * * * *